J. A. EDEN, Jr.
DRILL MACHINE.
APPLICATION FILED JUNE 15, 1914.
1,285,651.
Patented Nov. 26, 1918.
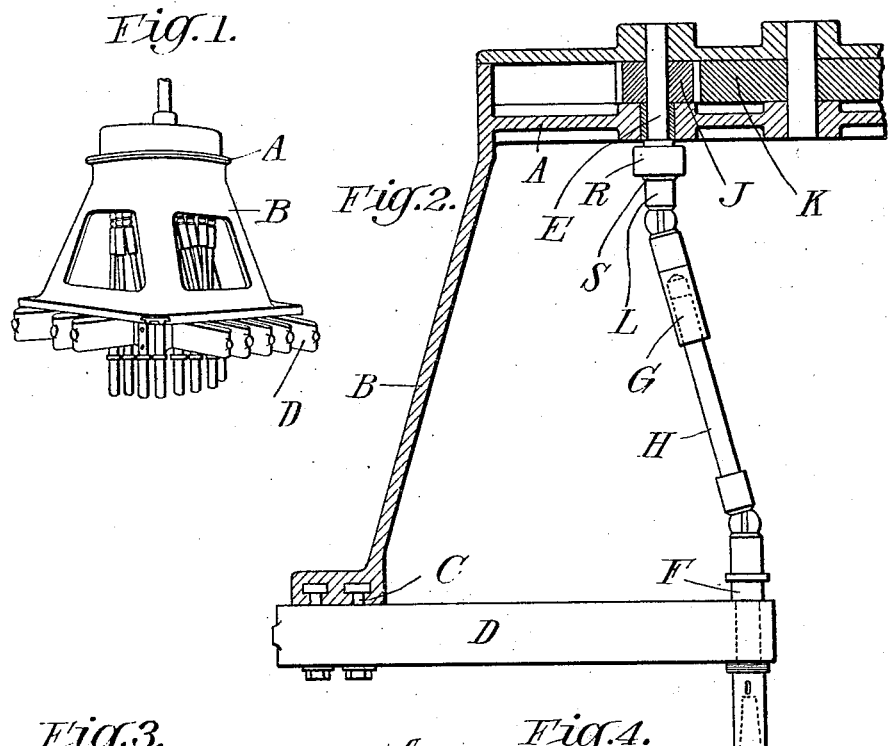
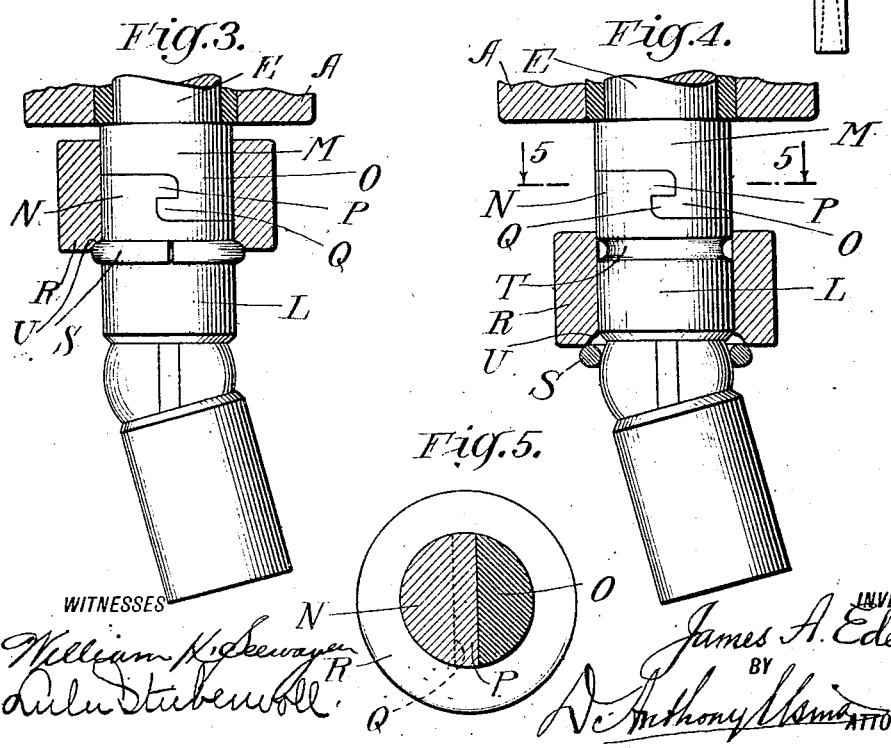
WITNESSES
INVENTOR
James A. Eden, Jr.
BY
D. Anthony Usina
ATTORNEY

UNITED STATES PATENT OFFICE.

JAMES A. EDEN, JR., OF SPRINGFIELD, MASSACHUSETTS, ASSIGNOR TO BAUSH MACHINE TOOL COMPANY, A CORPORATION OF MASSACHUSETTS.

DRILL-MACHINE.

1,285,651.  Specification of Letters Patent.  Patented Nov. 26, 1918.

Application filed June 15, 1914. Serial No. 845,323.

*To all whom it may concern:*

Be it known that I, JAMES A. EDEN, Jr., a citizen of the United States, residing in Springfield, Massachusetts, have invented certain new and useful Improvements in Drill-Machines, of which the following is a specification.

This invention aims to provide an improved construction of spindles for drills, especially useful in connection with multiple drill machines.

The accompanying drawings illustrate an embodiment of the invention as applied to a multiple drill machine.

Figure 1 is a perspective of the head of such a machine of a common type;

Fig. 2 is a section through the same illustrating the application of the invention thereto;

Figs. 3 and 4 are vertical elevations of the head section of the spindles with surrounding parts in cross section;

Fig. 5 is a horizontal section on the line 5—5 of Fig. 4.

In multiple drills it is common to provide a head A with a side flange B, the lower edge of which is also flanged and carries bolts C which pass through an arm D and permit adjustment of the latter lengthwise and pivotally; and to provide a number of spindles all mounted at their upper ends in the head A and each mounted at its lower end in the inner end of one of the adjustable arms D. In Fig. 2 I have illustrated this construction for one of the spindles. The flexible spindle comprises a head section E journaled in a fixed bearing in the head, an arm section F journaled in a bearing in the arm D and an intermediate extensible and flexible section comprising parts G and H telescoping into each other, the former connected by a universal joint with the head section and the latter connected by a similar joint with the arm section. The head section E of the spindle is driven from a pinion J through a central gear K. The tail section has at its lower end a socket to receive the drill.

Sometimes it is desired to use such machines with less than the whole number of spindles. The arms D and the lower portions H and F of the spindles which are not being used can be easily removed by unscrewing the nuts from the bolts C, but this leaves the head section and the part G of the flexible portion of the spindle in the machine. These parts have heretofore been connected by a permanent attachment such, for example, as a driven pin and the removal thereof has been slow and laborious. My invention provides a detachable connection of the flexible portion of the spindle to the head section, which permits the separation of these parts very quickly and without difficulty.

The hub L of the universal joint constitutes one of the end pieces of the flexible portions of the shaft. This and the end M of the head section E are tongued so that they may be engaged with and disengaged from each other by a lateral motion. The tongues N and O are complementary parts of a cylinder fitting with flat internal faces against each other so as to transmit the rotation of the one to the other. Preferably also they are formed with overhanging ends or hooks P and Q as shown in Figs. 3 and 4 so as to hold up the parts L and G. A locking ring R is provided having a free fit on the tongued end pieces L and M and adapted to surround such end pieces as in Fig. 3 to lock them together. A spring ring S fits in a groove T surrounding the end piece L and projects slightly therefrom so as to be engaged by the lower end of the locking ring when the latter is in its locking position and thus to hold the latter in such position. The locking ring R is provided on the inner portion of its edge with a groove U which fits over the spring ring in the locking position of Fig. 2 and thus holds the latter against accidental displacement.

When the flexible spindle is to be disconnected the locking ring R is lifted slightly to give access to the spring ring. The latter is then expanded slightly and lowered and the locking ring is shifted down to the position of Fig. 4, where it is below the tongued portions of the end pieces L and M. In this position the parts may be disconnected by a simple lateral movement of the upper end of the flexible portion of the shaft. The parts may be reassembled with the same ease by placing the end pieces L and M in proper engagement, raising the locking ring R to its highest position, introducing the spring S into its groove T and dropping the locking ring thereon.

The invention is applicable not only to the vertical drill machine illustrated but to machines working with the drills at various other angles and is applicable not only to multiple drill machines, but to various other machines where it is desired to provide a ready detachment of a spindle or any part thereof. In fact, though I have described with great particularity of detail a specific embodiment of my invention yet it is not to be understood that the invention is restricted to the particular embodiment described. Various modifications thereof in detail and in the arrangement of the parts may be made by those skilled in the art without departure from the invention as expressed in the following claims.

What I claim is—

1. A drill machine including a flexible spindle having a head section mounted in a fixed bearing and having a flexible portion, said head section and said flexible portion having tongued ends adapted to be engaged with and disengaged from each other by a lateral motion, and a locking ring adapted to surround said tongued ends when so engaged to lock them together, and to be shifted to a point beyond said tongued ends to release them and permit their separation, and a spring ring fitting in a groove near one of said tongued ends to hold said locking ring in its locking position and adapted to be removed to permit the shifting of the locking ring to its releasing position.

2. A drill machine including a flexible spindle having a head section mounted in a fixed bearing and having a flexible portion, said head section and said flexible portion having tongued ends adapted to be engaged with and disengaged from each other by a lateral motion, a locking ring adapted to surround said tongued ends when so engaged to lock them together, and to be shifted to a point beyond said tongued ends to release them and permit their separation, and a spring ring fitting in a groove near one of said tongued ends to hold said locking ring in its locking position and adapted to be removed to permit the shifting of the locking ring to its releasing position, said locking ring in its locking position being adapted to embrace the spring ring so as to hold the latter in place.

In witness whereof, I have hereunto signed my name in the presence of two subscribing witnesses.

JAMES A. EDEN, Jr.

Witnesses:
 ROGER D. BABSON,
 DAVID McCOMBE.